United States Patent [19]

Harmand

[11] Patent Number: 4,500,130
[45] Date of Patent: Feb. 19, 1985

[54] VEHICLE SEAT

[75] Inventor: Michel Harmand, Meudon-La-Foret, France

[73] Assignees: Automobiles Citroen, Neuilly; Automobiles Peugeot, Paris, both of France

[21] Appl. No.: 455,566

[22] Filed: Jan. 4, 1983

[30] Foreign Application Priority Data

Jan. 11, 1982 [FR] France .................. 82 00548

[51] Int. Cl.³ .............................................. B60N 1/02
[52] U.S. Cl. .................................. 296/65 R; 297/459; 297/422
[58] Field of Search ...................... 296/63, 65 R, 65 A, 296/66; 297/459, 422, 452

[56] References Cited

U.S. PATENT DOCUMENTS

| 1,898,008 | 2/1933 | Fox | 296/63 |
| 3,172,695 | 3/1965 | Bordinat et al. | 296/63 |
| 3,614,159 | 10/1971 | Christin | 297/459 |
| 3,632,157 | 1/1972 | Lohr | 296/63 |

Primary Examiner—Robert R. Song
Attorney, Agent, or Firm—Karl F. Ross

[57] ABSTRACT

The present invention relates to a seat for vehicle comprising a central console, of which the horizontal seat element comprises lateral pads, wherein at least part of its inner pad is independent of the horizontal seat element and fixed on the adjacent side wall of the console.

9 Claims, 6 Drawing Figures

VEHICLE SEAT

FIELD OF THE INVENTION

The present invention relates to a vehicle seat.

BACKGROUND OF THE INVENTION

The front seats of an automobile vehicle are often disposed on either side of a central console on which the control members may be mounted.

The horizontal seat elements of these seats generally comprise supple sides or side pads projecting with respect to the horizontal surface so as to hold the user in place and improve his/her comfort. In this case, a gap exists between the inner side of the seat and the adjacent side wall of the console, which may be the cause of loss of articles which are difficult to retrieve or the origin of fractures in the event of the car rolling over, if the user's hand or foot is caught therein. Moreover, this gap is unaesthetic.

OBJECT OF THE INVENTION

It is an object of the present invention to provide a seat for vehicle comprising a central console, which eliminates the above-mentioned gap and thus overcomes the above drawbacks.

SUMMARY OF THE INVENTION

The seat according to the invention is characterized in that at least part of its inner side pad is independent of the horizontal seat element of the seat and is fixed on the adjacent side wall of the console.

The inner pad may only be partially independent of the horizontal seat element, i.e. may comprise a portion fast with the horizontal seat and a portion fast with the console. However, it is easy to bring them close enough together in order virtually to avoid the formation of a gap.

The inner pad may also be totally independent of the horizontal seat element and may be fixed on the side wall of the console so as to cover the inner side edge of the horizontal seat surface. Any gap is thus eliminated.

It is advantageous, particularly if the seat is adjustable in translation, if the length of the inner pad is greater than that of the seat and if it extends virtually over the whole length of the console. The seat thus comprises an inner pad, whatever its position. In addition, aesthetic appearance and comfort are improved.

It is also advantageous if the inner pad extends in height above the console. In fact, in this case, it protects the control members which are borne by this console and are thus partially enclosed by the inner pads.

BRIEF DESCRIPTION OF THE DRAWING

The invention will be more readily understood on reading the following description with reference to the accompanying drawings, in which.

SPECIFIC DESCRIPTION

Figure 1:
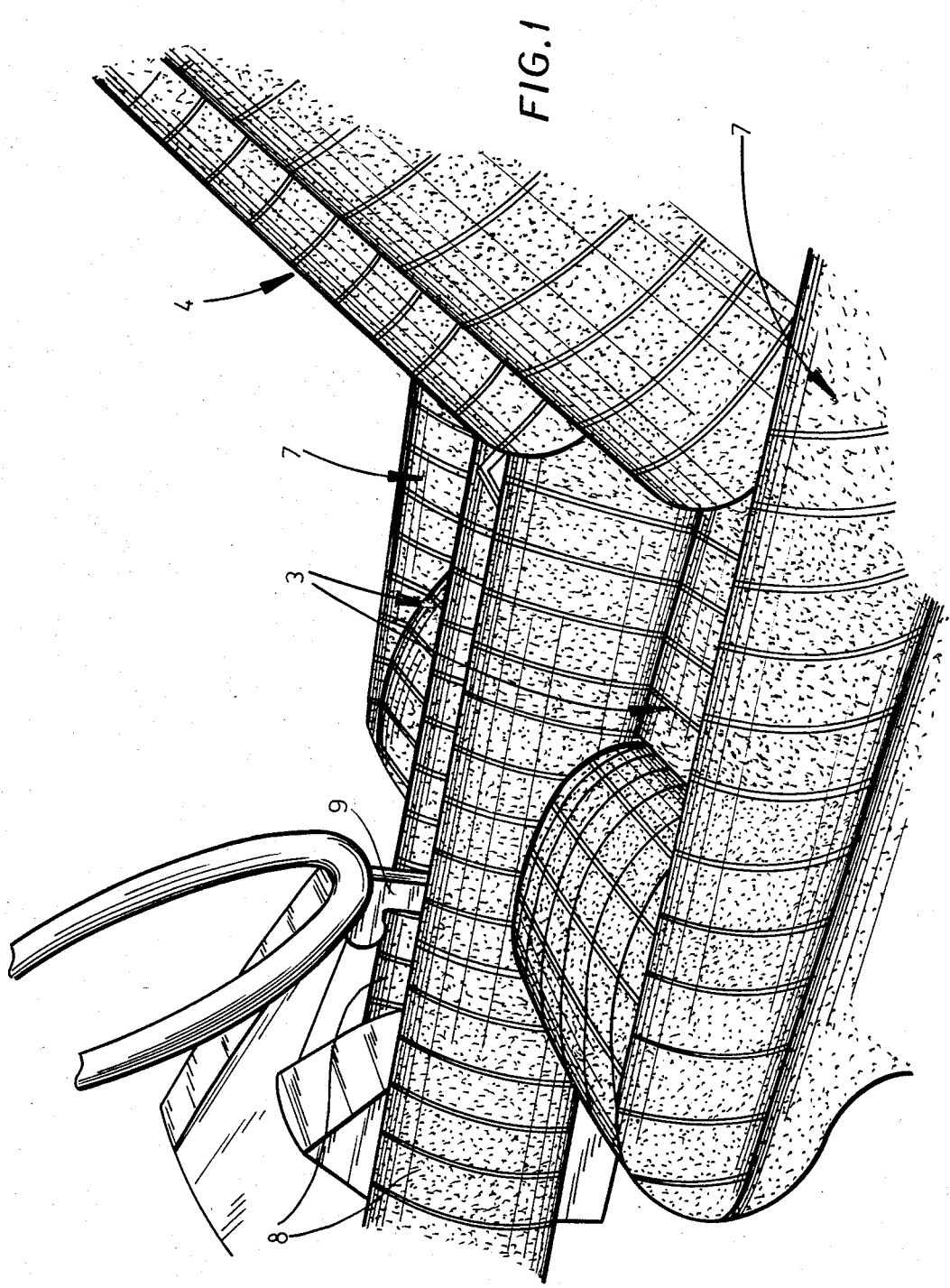
FIG. 1 is a view in perspective of the front seats of an automobile vehicle.
Figure 2:
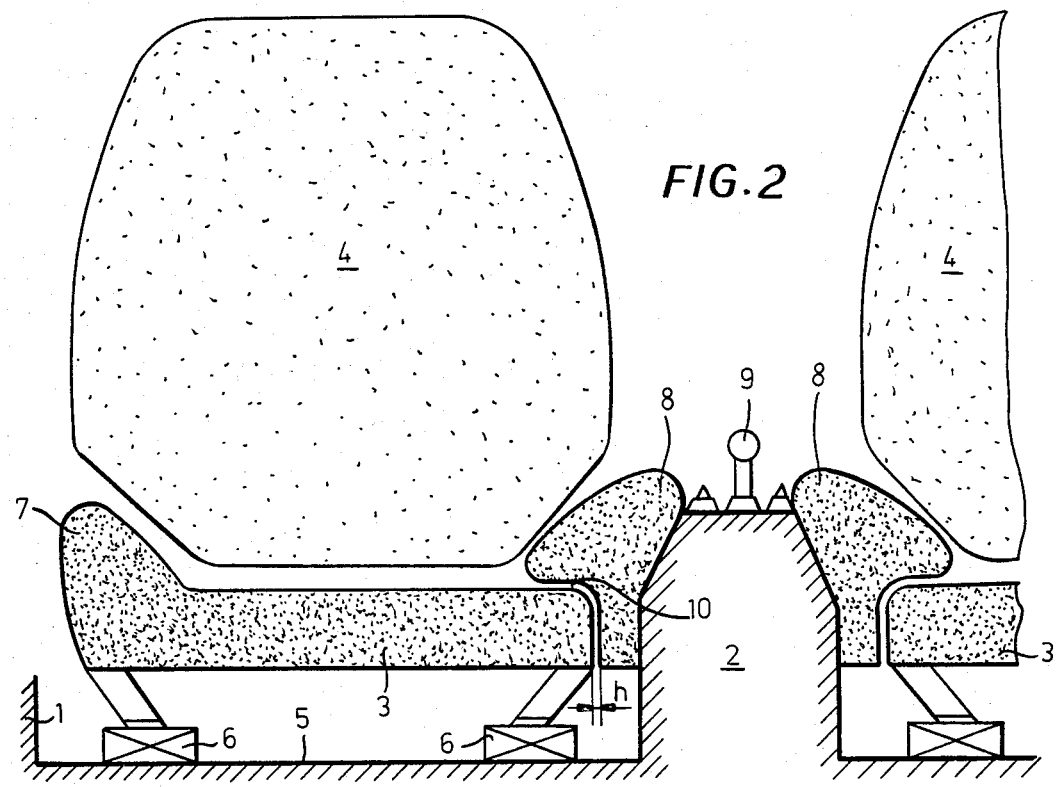
FIG. 2 is a front view of one of the seats of FIG. 1, the horizontal element being shown partly in section.

Referring now to the drawing, FIGS. 1 and 2 show the front seats of a vehicle of which the body 1 comprises a longitudinal median console 2.

Each of the seats comprises a horizontal seat element 3 and a back rest 4. The horizontal seat element 3 is mounted on the floor 5 of the body 1 via a translation device of known type, for example runners 6.

The horizontal seat element 3 is asymmetrical in shape. It comprises a lateral holding pad 7 on the outer side of the seat, i.e. on the side opposite the console 2. On the other side, a lateral holding pad 8 is also provided, but this one is independent of the horizontal seat element 3 and is fixed on the side of the console 2.

The holding pad 8 projects above the console 1 so that the controls 9 borne by this console are partially embedded and effectively protected. Furthermore, the length of this pad is greater than that of the horizontal seat element 3 and extends over virtually the whole length of the console so as to complete the horizontal seat element whatever the position of the seat.

In the embodiment of FIG. 2, the inner side part of the horizontal seat element 3 is housed in a recess 10 provided in the pad 8. The clearance h between the horizontal seat element 3 and the vertical wall of the recess is just sufficient to ensure mobility of the seat in translation.

Figure 3:
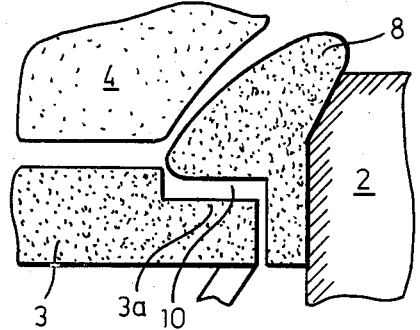
FIGS. 3 to 6 are views similar to FIG. 2, of other embodiments of the seat.
Figure 4:
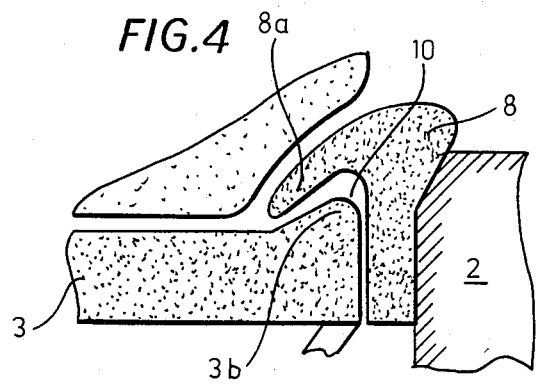

Various embodiments may be provided to improve the suspension of the seat and avoid the risks of interference between moving masses. For example, in FIG. 3, the pad 8 comprises recess 10, but the thickness of the inner part 3a of the horizontal seat element is less than the rest of the horizontal seat, in order better to balance the response of the cushion thereof. In FIG. 4, the horizontal seat element 3 comprises the beginning of a bead 3b which is housed in the recess 10 and is therefore not visible, the pad 8 comprising a supple tongue 8a which covers the bead 3b and easily absorbs the dimensional variations in manufacture and assembly, without braking the displacement of the seat.

Figure 5:
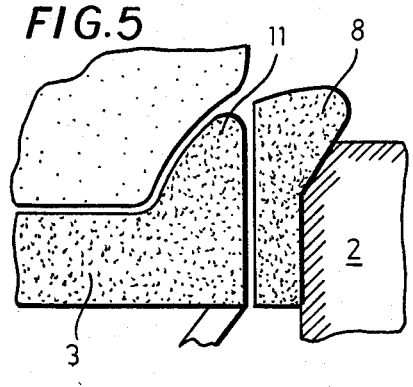

In FIG. 5, the horizontal seat element 3 comprises on the console 2 side a partial bead 11 which is completed by the pad 8 fixed to the console, the plane of separation of the two elements being vertical. The horizontal cushion element thus has a good balance.

Figure 6:
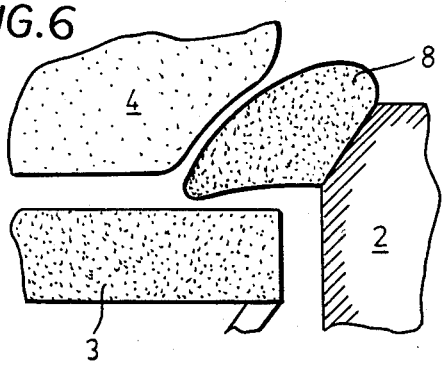

Finally, in FIG. 6, the inner lateral part 3a of the horizontal seat element is housed beneath the pad 8 which does not comprise any recess 10. The transverse section of the horizontal seat element is maximum.

It goes without saying that the present invention is not to be considered as being limited to the embodiment described and shown, but, on the contrary, covers all the variants thereof.

What I claim is:

1. In a seat for a vehicle comprising a central console, of which the horizontal seat element comprises lateral pads rising above a horizontal portion of a horizontal seat element of the seat which is movable in translation along said central console, the improvement wherein,
an inner pad member forming one of said lateral pads is independent of the horizontal seat element of the seat and is fixed on an adjacent side wall of the console.

2. The seat of claim 1 wherein the inner pad member fixed on the console is closely juxtaposed with an upwardly extending pad portion fixed to the horizontal seat element to form an inner pad.

3. The seat of claim 1 wherein the entire inner pad is totally independent of the horizontal seat element and is fixed on the side wall of the console so as to cover an inner side edge of the horizontal seat surface.

4. The seat of claim 3 wherein the inner pad comprises a recess in which is housed an inner lateral part of the horizontal-seat element.

5. The seat of claim 4 wherein the thickness of said inner part of the horizontal seat element is less than that of the rest of the horizontal seat element.

6. The seat of claim 4 wherein the horizontal seat element comprises a lateral bead housed in the recess and the pad comprises a supple tongue which covers the bead.

7. The seat of claim 3 wherein the inner lateral part of the horizontal seat element is housed beneath the pad.

8. The seat of claim 1 wherein the length of the inner pad is greater than that of the seat and it extends virtually over the whole length of the console.

9. The seat of claim 1 wherein the inner pad extends in height above the console.

* * * * *